United States Patent
Hakoda (10) Patent No.: US 7,128,855 B2
(45) Date of Patent: *Oct. 31, 2006

(54) MOLD-CLAMPING CONTROL METHOD FOR INJECTION MOLDING MACHINE

(75) Inventor: Takashi Hakoda, Nagano (JP)

(73) Assignee: Nissei Plastic Industrial Co., Ltd., Nagano-Ken (JP)

( * ) Notice: Subject to any disclaimer, the term of this patent is extended or adjusted under 35 U.S.C. 154(b) by 170 days.

This patent is subject to a terminal disclaimer.

(21) Appl. No.: 10/834,034

(22) Filed: Apr. 29, 2004

(65) Prior Publication Data

US 2004/0219257 A1   Nov. 4, 2004

(30) Foreign Application Priority Data

May 2, 2003   (JP)   ............... 2003-127399

(51) Int. Cl.
  B29C 45/64   (2006.01)
  B29C 45/80   (2006.01)
(52) U.S. Cl. ............... 264/40.1; 264/40.5; 264/328.1; 425/137; 425/150; 425/589
(58) Field of Classification Search ............... 264/40.1, 264/40.5, 328.1; 425/137, 138, 150, 589, 425/595, 593
See application file for complete search history.

(56) References Cited

U.S. PATENT DOCUMENTS

| | | | | |
|---|---|---|---|---|
| 4,685,876 A | * | 8/1987 | Loscei | 425/170 |
| 4,988,273 A | * | 1/1991 | Faig et al. | 425/145 |
| 5,115,418 A | * | 5/1992 | Shimada | 318/616 |
| 5,304,906 A | * | 4/1994 | Arita et al. | 318/568.16 |
| 5,631,851 A | * | 5/1997 | Tanaka et al. | 702/33 |
| 6,409,495 B1 | * | 6/2002 | Kamiguchi et al. | 264/40.1 |
| 2006/0093695 A1 | * | 5/2006 | Ueda et al. | 425/150 |

FOREIGN PATENT DOCUMENTS

| | | | |
|---|---|---|---|
| JP | 04-368832 | * | 12/1992 |
| JP | 2001-51721 | * | 2/2001 |
| JP | 2002-172670 A | | 6/2002 |

* cited by examiner

*Primary Examiner*—Jill L. Heitbrink
(74) *Attorney, Agent, or Firm*—Birch, Stewart, Kolasch & Birch, LLP

(57) ABSTRACT

A mold-clamping control method for an injection molding machine includes the steps of detecting a value of a monitor item in a monitor region predetermined in relation to a mold closing operation during the course of a mold clamping step; differentiating the detected value in order to obtain a differential detection value; and performing emergency processing when the differential detection value exceeds a threshold value. The monitor item may be torque or velocity of a servomotor for performing a mold closing operation.

7 Claims, 8 Drawing Sheets

| SHOT COUNT | SAMPLING ORDER | | | |
|---|---|---|---|---|
| | t0 | t1 | ... | tn |
| 1 | 11.0 | 12.0 | ... | 12.0 |
| 2 | 11.2 | 12.2 | ... | 12.1 |
| 3 | 11.1 | 11.8 | ... | 12.3 |
| 4 | 11.2 | 11.9 | ... | 11.8 |
| 5 | 11.2 | 11.9 | ... | 12.1 |
| 6 | 11.5 | 12.1 | ... | 12.2 |
| 7 | 11.6 | 11.2 | ... | 11.8 |
| 8 | 11.3 | 11.5 | ... | 11.9 |
| 9 | 11.2 | 10.8 | ... | 12.0 |
| 10 | 11.0 | 11.3 | ... | 12.1 |
| AVERAGE VALUE Xi | 11.2 | 11.7 | ... | 12.0 |
| MAXIMUM VALUE Xw | 11.6 | 12.5 | ... | 12.3 |

MOLD-CLAMPING CONTROL METHOD FOR INJECTION MOLDING MACHINE

This Nonprovisional application claims priority under 35 U.S.C. § 119(a) on Patent Application No(s) 2003-127399 filed in JAPAN on May 2, 2003, the entire contents of which are hereby incorporated by reference.

BACKGROUND OF THE INVENTION

1. Field of the Invention

The present invention relates to a mold-clamping control method for an injection molding machine, which method is favorably used in detecting a foreign object that is caught between a movable mold and a stationary mold during the course of a mold clamping step.

2. Description of the Related Art

Conventionally, in the field of an injection molding machine designed such that reciprocating motion produced by a drive unit composed of a servomotor and a ball-screw mechanism is transmitted to a movable platen via a toggle link mechanism, there has been known a foreign-object detection method for detecting a foreign object (e.g., a molded product) that is caught between a movable mold and a stationary mold upon movement of the movable platen in a mold closing direction (see, for example, Japanese Patent Application Laid-Open (kokai) No. 2002-172670).

The patent publication discloses a foreign-object detection method for an injection molding machine, including the steps of detecting a physical value related to a mold closing action in a monitor region during the course of a mold clamping step; and performing emergency processing associated with detection of a foreign object when a deviation between the detected physical value and a predetermined theoretical value is in excess of a threshold value. In the foreign-object detection method, a trial mold clamping operation is performed to thereby detect a maximum value of the deviation; and the maximum value is added to a preset reference value to thereby determine a threshold value to be used for foreign object detection.

In the above-mentioned foreign-object detection method (mold-clamping control method), the maximum deviation between the detected physical value and the preset theoretical value is added to the reference value to thereby determine the threshold value. Thus, the method can promptly and readily determine a fixed threshold value with high accuracy and high reliability.

However, the magnitude of a physical value related to a mold closing operation in a monitor region usually varies depending on, for example, dimensional errors and wear of mechanisms, lubrication and adjustment for maintenance, and uneven rotation of a servomotor. In the case of an automatic 24-hour operation, the magnitude of a physical value varies (Shifts) depending on an hour of the day because of, for example, temperature variations (temperature drift) between day and night. Thus, when the threshold value is fixed, erroneous detection may arise as a result of variations in a physical value caused by a disturbance. Such a conventional method may cause unnecessary suspension of operation, thus involving unnecessary inspection by an operator, delay in a production schedule, and a failure to provide high consistency and high reliability in terms of mold-clamping control.

SUMMARY OF THE INVENTION

An object of the present invention is to provide a mold-clamping control method for an injection molding machine free from any influence of an incident in which the entirety of extracted values (torque detection values or velocity detection values) is shifted because of torque variations caused by, for example, a temperature drift, thereby avoiding erroneous detection.

Another object of the present invention is to provide a mold-clamping control method for an injection molding machine capable of avoiding unnecessary suspension of operation and ensuring high consistency and high reliability in terms of mold-clamping control.

Still another object of the present invention is to provide a mold-clamping control method for an injection molding machine capable of reliably avoiding breakage of a caught molded product (a caught foreign object) and damage to a mold.

To achieve the above objects, the present invention provides a mold-clamping control method for an injection molding machine, comprising the steps of detecting a value of a monitor item in a monitor region predetermined in relation to a mold closing operation during the course of a mold clamping step; differentiating the detected value in order to obtain a differential detection value; and performing emergency processing when the differential detection value exceeds a threshold value.

DETAILED DESCRIPTION OF THE PREFERRED EMBODIMENT

An embodiment of the present invention will next be described in detail with reference to the drawings. The accompanying drawings are illustrative of the embodiment and are not meant to limit the scope of the invention. In order to describe the invention clearly, detailed description of known parts is omitted.

First, the structure of an injection molding machine 1 to which a mold-clamping control method of the present embodiment can be applied will be described with reference to FIGS. 4 and 5.

Figure 4:
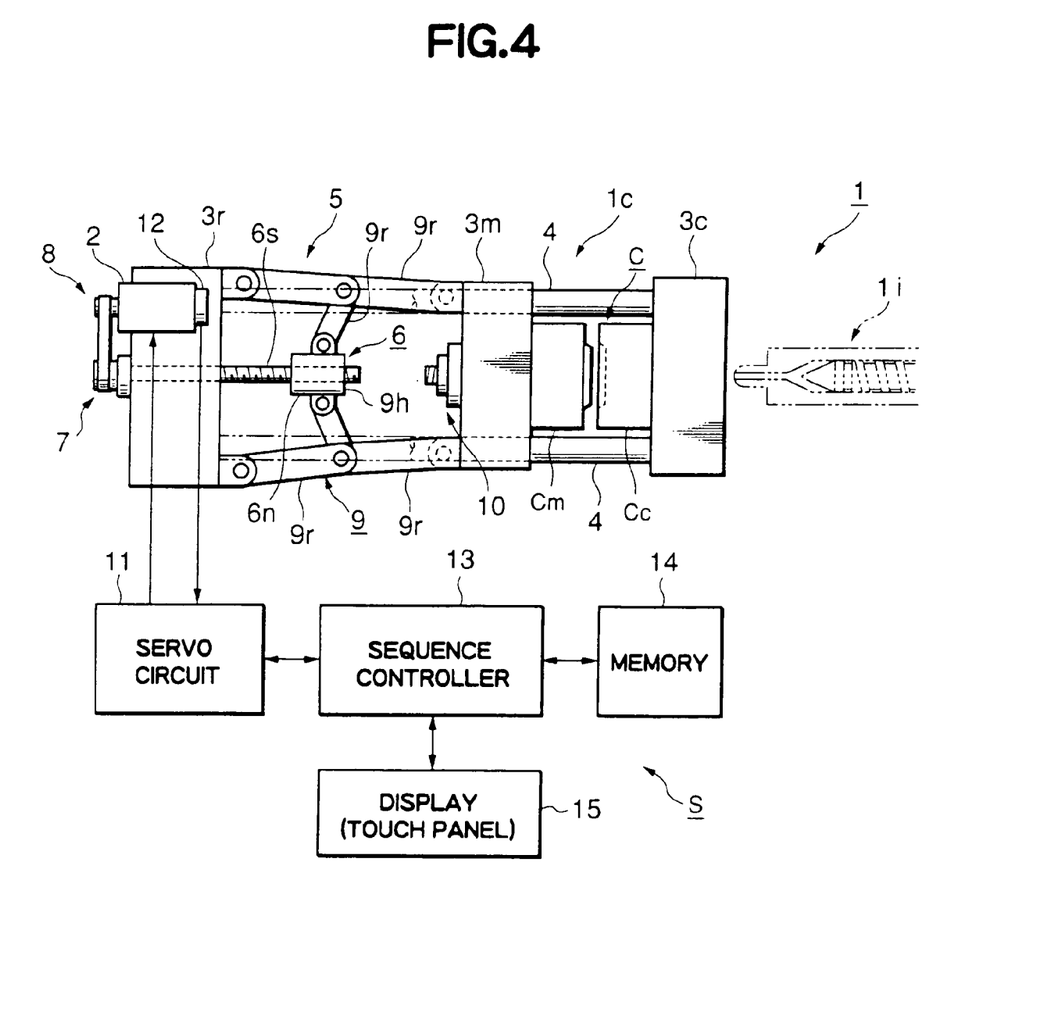
FIG. 4 is a view showing the structure of an injection molding machine to which the mold-clamping control method can be applied.

The injection molding machine 1 shown in FIG. 4 includes a mold clamping apparatus 1c, and an injection apparatus 1i indicated by an imaginary line. The mold clamping apparatus 1c includes a stationary platen 3c and a drive base 3r which are separated from each other. The stationary platen 3c and the drive base 3r are fixedly mounted on an unillustrated machine base. Four tie bars 4 extend between the stationary platen 3c and the drive base 3r. A movable platen 3m is mounted slidably on the tie bars 4. A movable mold Cm is attached to the movable platen 3m, and a stationary mold Cc is attached to the stationary platen 3c. The movable mold Cm and the stationary mold Cc constitute a mold C.

A drive mechanism 5 is disposed between the drive base 3r and the movable platen 3m. The drive mechanism 5 includes a drive unit 8, and a toggle link mechanism 9 attached between the drive base 3r and the movable platen 3m. The drive unit 8 includes a servomotor 2 attached to the drive base 3r; a ball screw mechanism 6 composed of a ball screw 6s rotatably supported on the drive base 3r and a nut 6n in screw-engagement with the ball screw 6s; and a rotation transmission mechanism 7 for transmitting rotation of the servomotor 2 to the ball screw 6s. The toggle link mechanism 9 is composed of a plurality of toggle link members 9r; and the nut 6n is fixed to a cross head 9h serving as an input portion. By virtue of the above-described configuration, reciprocating motion of the nut 6n is transmitted to the movable platen 3m via the toggle link mechanism 9. Reference numeral 10 denotes an ejector mechanism.

Meanwhile, reference letter S denotes a control system. The control system S includes a servo circuit 11, to which are connected the servomotor 2 and a rotary encoder 12 attached to the servomotor 2. A sequence controller 13 is connected to the servo circuit 11; and memory 14 and a display 15 having a touch panel are connected to the sequence controller 13.

Figure 5:
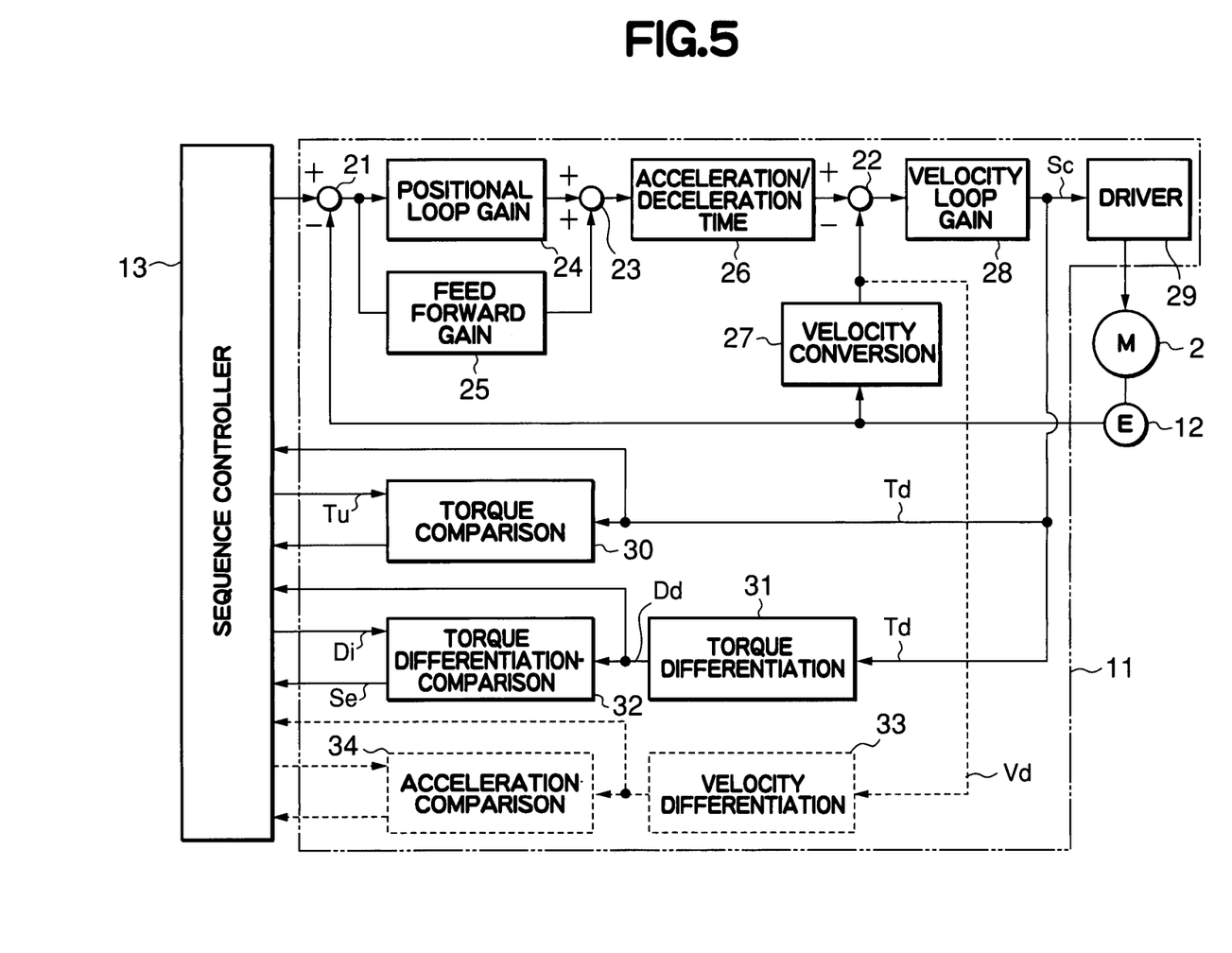
FIG. 5 is a block diagram of a servo circuit of the injection molding machine.

FIG. 5 shows a specific configuration of the servo circuit 11. The servo circuit 11 includes deviation calculation units 21 and 22; an adder 23; a positional-loop-gain setting unit 24; a feed-forward-gain setting unit 25; an acceleration/deceleration-time setting unit 26; a velocity converter 27; a velocity-loop-gain setting unit 28; a driver 29; a torque comparison section 30; a torque differentiator 31; a torque differentiation-comparison section 32; a velocity differentiator 33; and an acceleration comparison section 34, to thereby constitute the servo control system as shown in FIG. 5. The functions (operations) of the respective portions will be described in relation to overall operation of the mold clamping apparatus 1c, which will be described later.

Next, overall operation of the mold clamping apparatus 1c which employs the mold-clamping control method according to the present embodiment will be described with reference to FIGS. 1 to 9.

Figure 1:
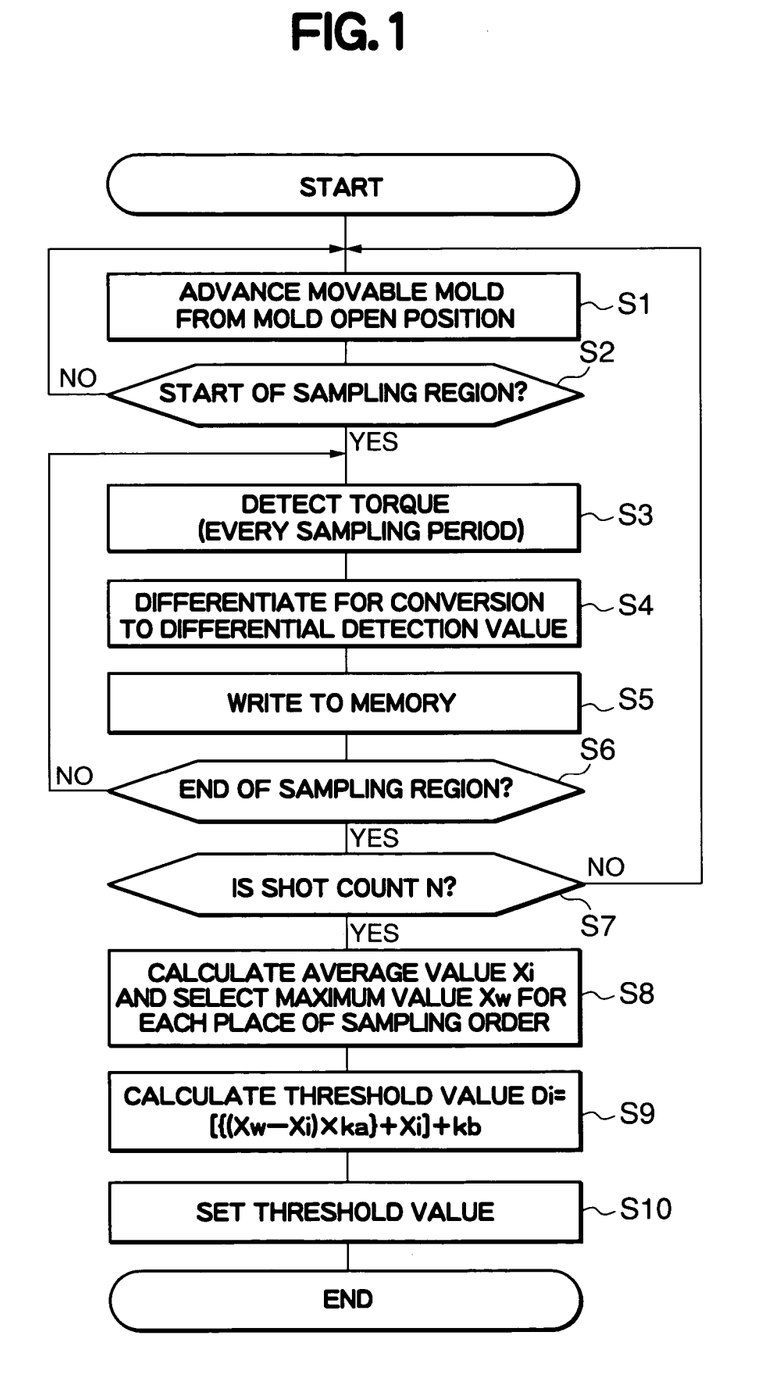
FIG. 1 is a flowchart showing a method of setting a threshold value used in a mold-clamping control method according to an embodiment of the present invention.

First, a method of setting a threshold value Di used in the mold-clamping control method according to the present embodiment will be described with reference to the flowchart of FIG. 1.

When the mold-clamping control method according to the present embodiment is to be performed, the automatic setting mode is selected by means of a relevant function key displayed on the display 15. Selection of the automatic setting mode causes initialization of the threshold value Di. This initialization can usually be performed through trial molding. Here, we assume that the movable platen 3m is located at the mold open position before start of the operation of the injection molding machine 1. Start of trial molding activates the servomotor 2, and the movable platen 3m is advanced from the mold open position (step S1). In this case, initially, the movable platen 3m is advanced at high speed in the mold closing direction, whereby high-speed mold closing is effected At this time, the servo circuit 11 performs velocity control and position control on the movable platen 3m. Specifically, the sequence controller 13 supplies a position command value to the deviation calculation unit 21 of the servo circuit 11. The deviation calculation unit 21 compares the position command value with a position detection value obtained from detection pulses output from the rotary encoder 12. Thus, there is obtained a positional deviation, on the basis of which position feedback control is performed. Notably, the positional deviation is compensated by the positional-loop-gain setting unit 24, the feed-forward-gain setting unit 25, and the acceleration/deceleration-time setting unit 26. An output of the acceleration/deceleration-time setting unit 26 is supplied to the deviation calculation unit 22 and compared with an output of the velocity converter 27. Thus, there is obtained a velocity deviation, on the basis of which velocity feedback control is performed. Notably, the velocity deviation is compensated by the velocity-loop-gain setting unit 28.

When the movable platen 3m is advanced in the mold closing direction and reaches a start point of a predetermined sampling region (monitor region), detection of a monitor item starts; specifically, torque (load torque), which is a monitor item, is periodically detected at predetermined sampling intervals $\Delta$ts (steps S2 and S3). In this case, the sampling region can be set between a start point of low-pressure mold clamping (low-velocity mold closing) and a start point of high-pressure mold clamping. These start points may be set in terms of either position or time. Notably, the sampling intervals $\Delta$ts can be set to, for example, 2.5 ms. When the duration of the sampling region is assumed to be 8 seconds, the total sampling count is 3,200.

Load torque is detected by extracting a velocity control signal from the velocity-loop-gain setting unit 28. Since the magnitude of the velocity control signal Sc corresponds to the magnitude of load torque, a voltage of the velocity control signal Sc is used as an extraction value (torque detection value) Td. The torque detection value Td that is periodically detected at the sampling intervals $\Delta$ts is differentiated by the torque differentiator 31 to thereby be converted to a differential detection value Dd. The differential detection value Dd and the torque detection value Td are written to a data area of the memory 14 via the sequence controller 13 (steps S4 and S5). A detecting operation for obtaining the differential detection value Dd is periodically performed at the sampling intervals $\Delta$ts until the sampling region ends (steps S6, S3, etc.).

Figure 7:
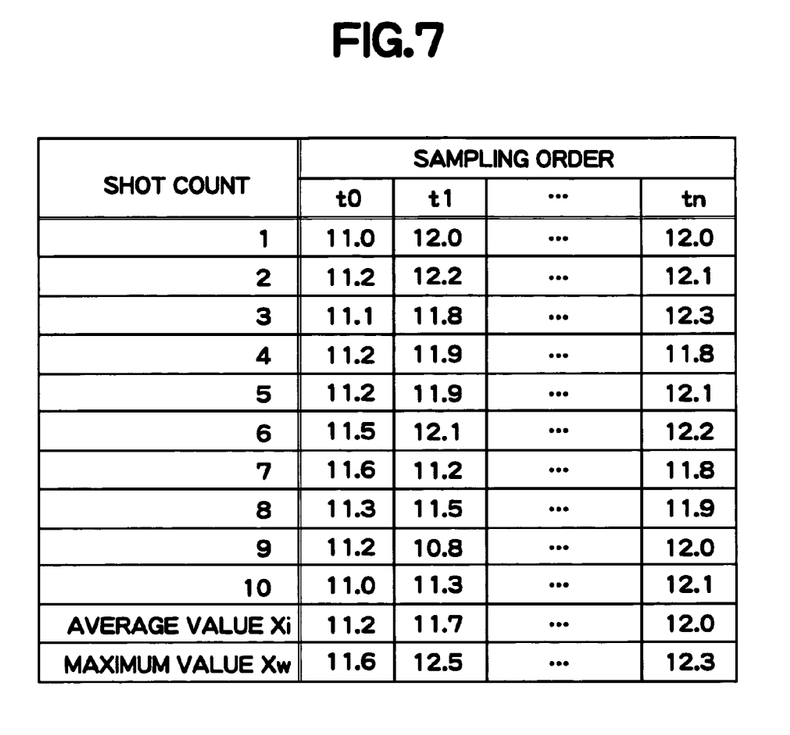
FIG. 7 is a table of detection values obtained through performance of the mold-clamping control method.
Figure 8:
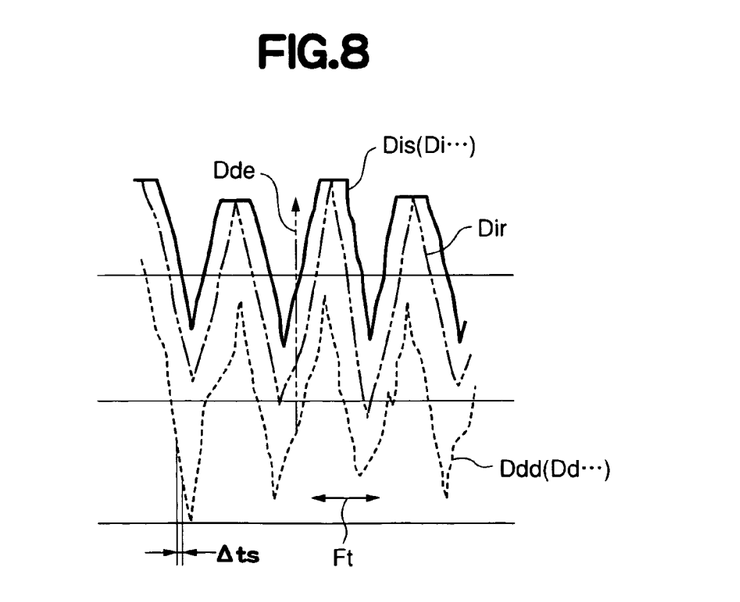
FIG. 8 is a diagram for explaining a method of selecting a maximum value during performance of the mold-clamping control method.

When the first shot (molding cycle) is completed, the next shot is performed. Similarly, the differential detection value Dd is obtained through detection. Detection for obtaining the differential detection value Dd is performed for each of a predetermined number (N) of shots (steps S7, S3, etc.). FIG. 7 is a table of the differential detection values Dd contained in the data area of the memory 14. In the present embodiment, the shot count N is set to "10," and sampling is performed in the sampling order of t0, t1, . . . , tn for a single shot.

When detection is completed for all of N shots, an average value Xi is calculated from the obtained differential detection values Dd that pertain to the same place of sampling order with respect to all of the shots (step S8). In FIG. 7, the average value Xi for the differential detection values Dd that pertain to, for example, the place t1 of sampling order (with respect to 10 shots) is "11.7." A maximum value Xw is selected from the differential detection values Dd that pertain to the same place of sampling order with respect to all of the shots (step S8). In FIG. 7, the maximum value Xw for, for example, the place t1 of sampling order is "12.5."

In this case, the maximum value Xw is a greatest value selected from the differential detection values Dd that pertain to a plurality of places of sampling order consisting of the place concerned and a predetermined number of preceding and subsequent places of sampling order. The reason for this will be described with reference to FIG. 8. In the case where the maximum value is selected from values that pertain to the same place of sampling order, threshold value data vary as represented by Dir in FIG. 8, which graphs the threshold values Di in a time series manner. The threshold value data Dir vary with a tendency similar to that of detection value data Ddd shown in FIG. 8 except that the threshold value data Dir is offset upward from the detection value data Ddd. The detection value data Ddd is represented by graphing the differential detection values Dd in a time series manner. However, the detection data Ddd do not necessarily appear synchronously with the threshold value data Dir, but are dispersed in a time axis direction Ft; e.g., the detection data Ddd involve time lag. As a result, in some cases, the detection value data Ddd may exceed the threshold value data Dir at a certain point in the time axis direction Ft, resulting in occurrence of erroneous detection.

The above problem is avoided as follows. The maximum value Xw is a greatest value selected from the values that pertain to a plurality of places of sampling order consisting of the place concerned and a predetermined number of preceding and subsequent places of sampling order, thereby expanding a peak value of the threshold value data Dir along a predetermined time span in the time axis direction Ft as represented by threshold value data Dis in FIG. 8. In this case, the range of expansion (a predetermined range) can be arbitrarily set by selecting a numerical value, such as 1, 2, 3, 4. For example, when "1" is selected, one preceding place of sampling order and one subsequent place of sampling order are added to the place concerned. Thus, when "1" is selected, the predetermined range means three consecutive places of sampling order. Specifically, when the maximum value Xw is to be selected for the place t1 of sampling order, a maximum value is selected, for use as the maximum value Xw, from the values that pertain to the t0, t1, and t2 places of sampling order. Similarly, when "2" is selected, two preceding places of sampling order and two subsequent places of sampling order are added to the place concerned. Thus, the predetermined range means five consecutive places of sampling order. Notably, FIG. 7 shows an example case where the maximum value Xw for the place t1 of sampling order is a maximum value (not shown) appearing in the place t2 of sampling order.

The thus-obtained average value Xi and maximum value Xw are used to obtain the threshold value Di for each place of sampling order by use of the following arithmetic expression (step S9):

$$Di = Pi + kb$$
$$= [\{(Xw - Xi) \times ka\} + Xi] + kb$$

(where ka and kb are constants)

In this case, Pi is a reference value; and the constant kb is used to set a predetermined allowance (offset) for the reference value Pi. The constant ka can usually be set to an arbitrary value ranging from "1 to 2."

In place of the average value Xi, a median Xj can be used. Specifically, a minimum value Xs and a maximum value Xw are obtained from the differential detection values Dd that pertain to the same place of sampling order with respect to all of the shots; the median Xj is obtained, on the basis of the minimum value Xs and the maximum value Xw, by use of the arithmetic expression $Xj=(Xw-Xs)/2$; and the threshold value Di for each place of sampling order is obtained, on the basis of the median Xj and the maximum value Xw, by use of the following arithmetic expression:

$$Di = [\{(Xw - Xj) \times ka\} + Xj] + kb$$

(where ka and kb are constants)

In the above arithmetic expression, the constants ka and kb may be identical to the aforementioned constants ka and kb or may differ from them as needed.

Figure 6:
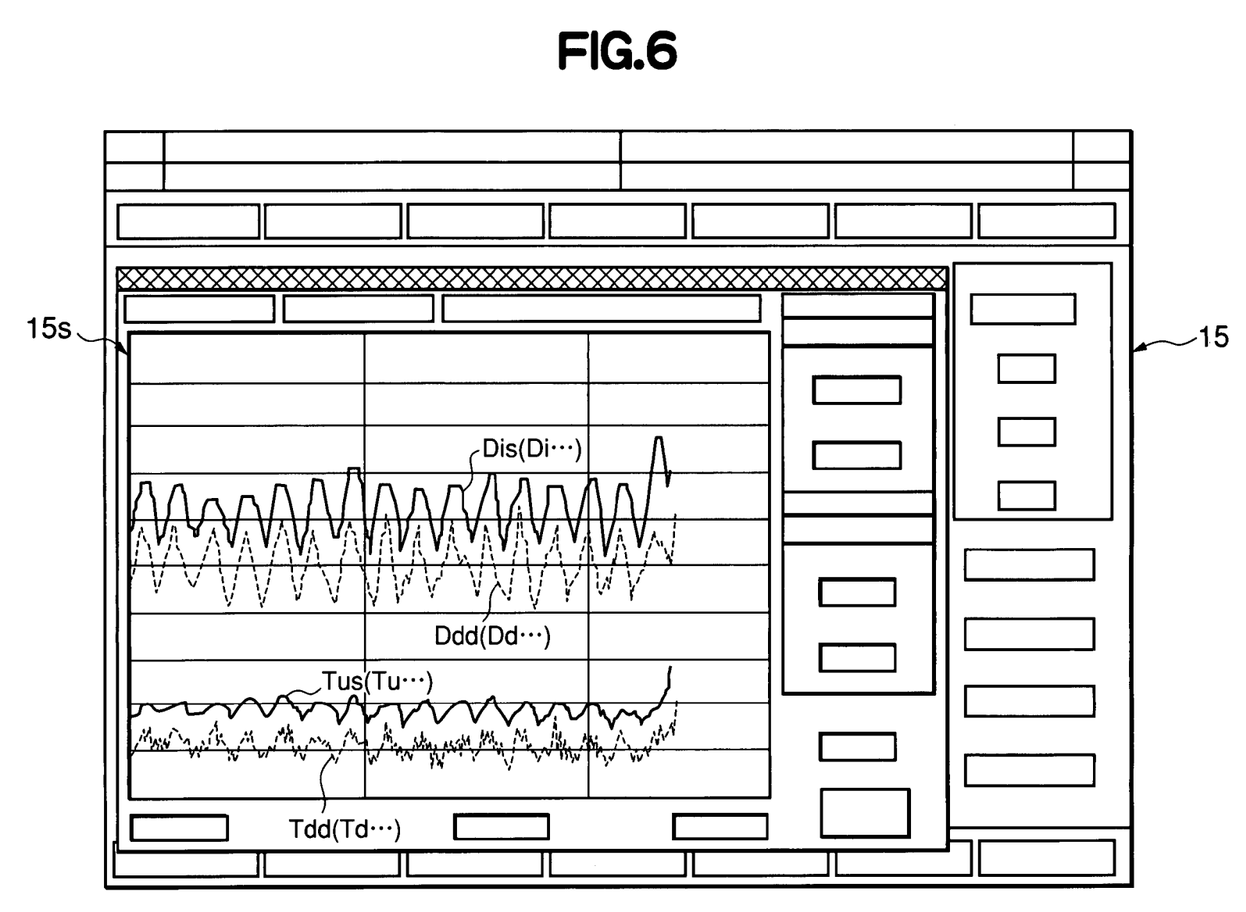
FIG. 6 is a diagram showing a display screen used during performance of the mold-clamping control method.

The thus-obtained threshold values Di are set in the memory 14 and displayed on a data display section 15s of the display 15 shown in FIG. 6 (step S10). In FIG. 6, Dis indicates threshold value data represented by graphing the set threshold values Di. The above-described series of operations for obtaining the threshold values Di (threshold value data Dis) is performed fully automatically by means of sequence operations.

Meanwhile, upon obtainment of the torque detection value Td, a torque limit value Tu is automatically set for use in performing torque limitation in a monitor region during the course of a mold clamping step. Specifically, the torque detection value Td is written to the data area of the memory 14 via the sequence controller 13. In this case, a series of operations for obtaining the torque detection value Td is performed similarly as in the case of the above-described differential detection value Dd. More specifically, the torque detection value Td is periodically obtained through periodical detection at the sampling intervals Δts in the sampling region. Detection for obtaining the torque detection value Td is performed for each of N shots. When the detection is completed for all of N shots, an average value Ai is calculated from the torque detection values Td that pertain to the same place of sampling order with respect to all of the shots. Also, a maximum value Aw is selected. As in the case of the above-described differential detection value Dd, the maximum value Aw is a greatest value selected from the torque detection values Td that pertain to a plurality of places of sampling order consisting of the place concerned and a predetermined number of preceding and subsequent places of sampling order. The thus-obtained average value Ai and maximum value Aw are used to obtain the torque limit value Tu for each place of sampling order by use of the following arithmetic expression:

$$Tu = Qi + kq$$
$$= [\{(Aw - Ai) \times kp\} + Ai] + kq$$

(where kp and kq are constants)

In this case, Qi is a reference value; and the constant kq is used to set a predetermined allowance (offset) for the reference value Qi. The constant kp can usually be set to an arbitrary value ranging from "1 to 2."

Notably, the torque limit value Tu can also be obtained in the following manner. A minimum value As and the maximum value Aw are obtained from the torque detection values Td that pertain to the same place of sampling order with respect to all of the shots; a median Aj is obtained, on the basis of the minimum value As and the maximum value Aw, by use of the arithmetic expression Aj=(Aw−As)/2; and the torque limit value Tu for each place of sampling order is obtained, on the basis of the median Aj and the maximum value Aw, by use of the following arithmetic expression:

$$Tu = Qi + kq$$
$$= [\{(Aw - Aj) \times kp) + Aj] + kq$$

(where kp and kq are constants)

In the above arithmetic expression, the constants kp and kq may be identical to the aforementioned constants kp and kq or may differ from them as needed.

The thus-obtained torque limit values Tu are set in the memory 14 and displayed on the data display section 15s of the display 15 shown in FIG. 6. In FIG. 6, Tus indicates torque limit value data represented by graphing the set torque limit values Tu. The above-described series of operations for obtaining the torque limit values Tu (torque limit value data Tus) is performed fully automatically by means of sequence operations.

Figure 2:
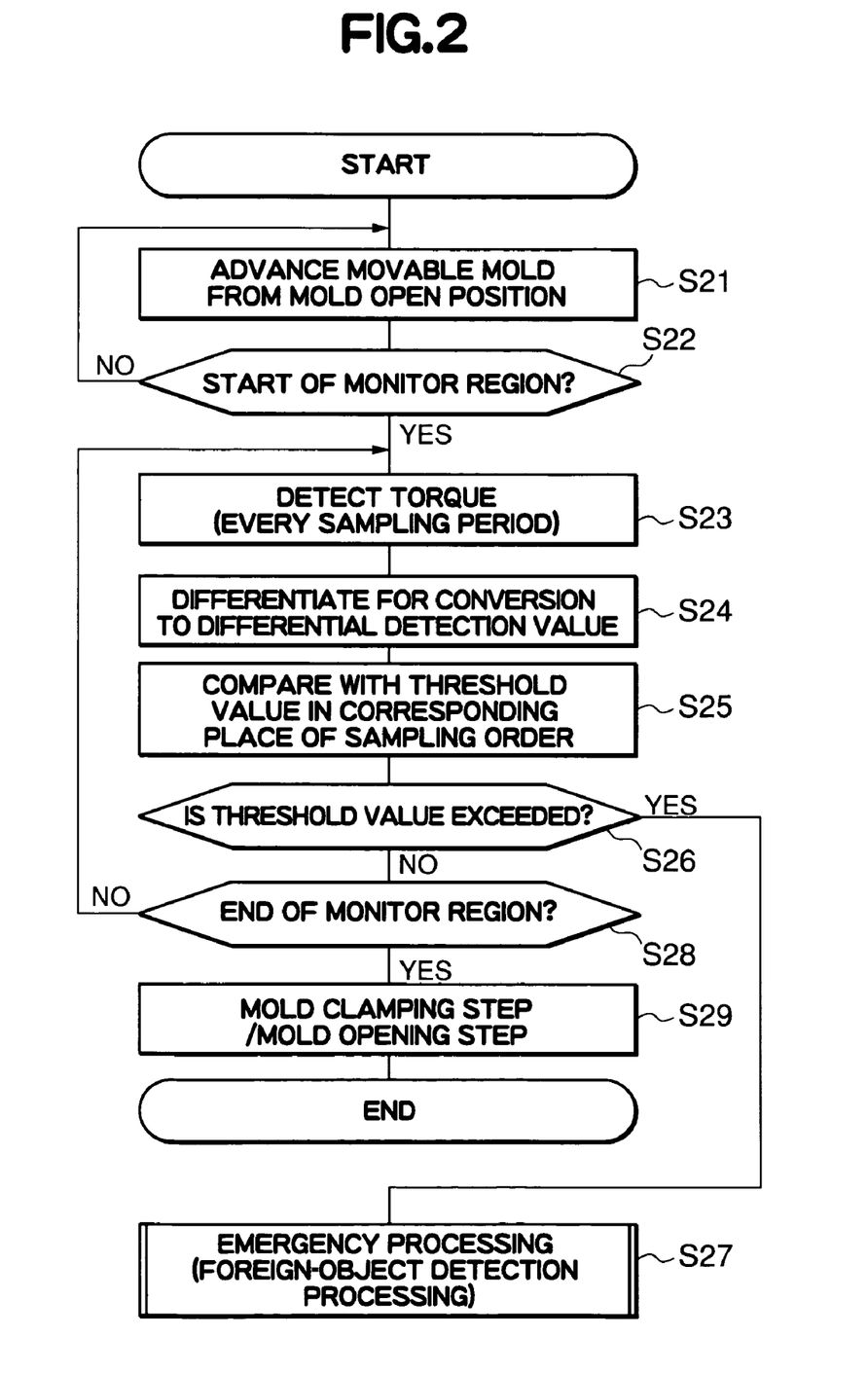
FIG. 2 is a flowchart showing the mold-clamping control method in relation to overall operation during a production run.

Next, overall operation of the injection molding machine during a production run will be described with reference to the flowchart shown in FIG. 2.

Here, we assume that the movable platen 3m of the mold clamping apparatus 1c is located at the mold open position before start of the operation of the injection molding machine 1. In a mold clamping step, the servomotor 2 is activated, and the movable platen 3m is advanced from the mold open position (step S21). Initially, the movable platen 3m is advanced at high speed in the mold closing direction, whereby high-speed mold closing is effected. As in the aforementioned case where the threshold value Di is initialized, the servo circuit 11 performs velocity control and position control on the movable platen 3m. When the movable platen 3m reaches a predetermined monitor region during movement in the mold closing direction, torque (load torque (torque detection value Td)) is periodically detected at the aforementioned sampling intervals Δts (steps S22 and S23). The monitor region is identical to the aforementioned sampling region.

As in the case where the threshold value Di is initialized, torque is detected through extraction of the velocity control signal Sc from the velocity-loop-gain setting unit 28. The torque detection value Td that is thus-obtained periodically at the sampling intervals Δts is supplied to the torque differentiator 31 and differentiated by the differentiator 31 to thereby be converted to the differential detection value Dd (step S24). The differential detection value Dd is supplied to the torque differentiation-comparison section 32. Meanwhile, the threshold value Di identical in a place of sampling order with the differential detection value Dd is supplied to the torque differentiation-comparison section 32 from the sequence controller 13. Thus, the torque differentiation-comparison section 32 compares the threshold value Di and the differential detection value Dd that pertain to the same place of sampling order (step S25).

Figure 9:
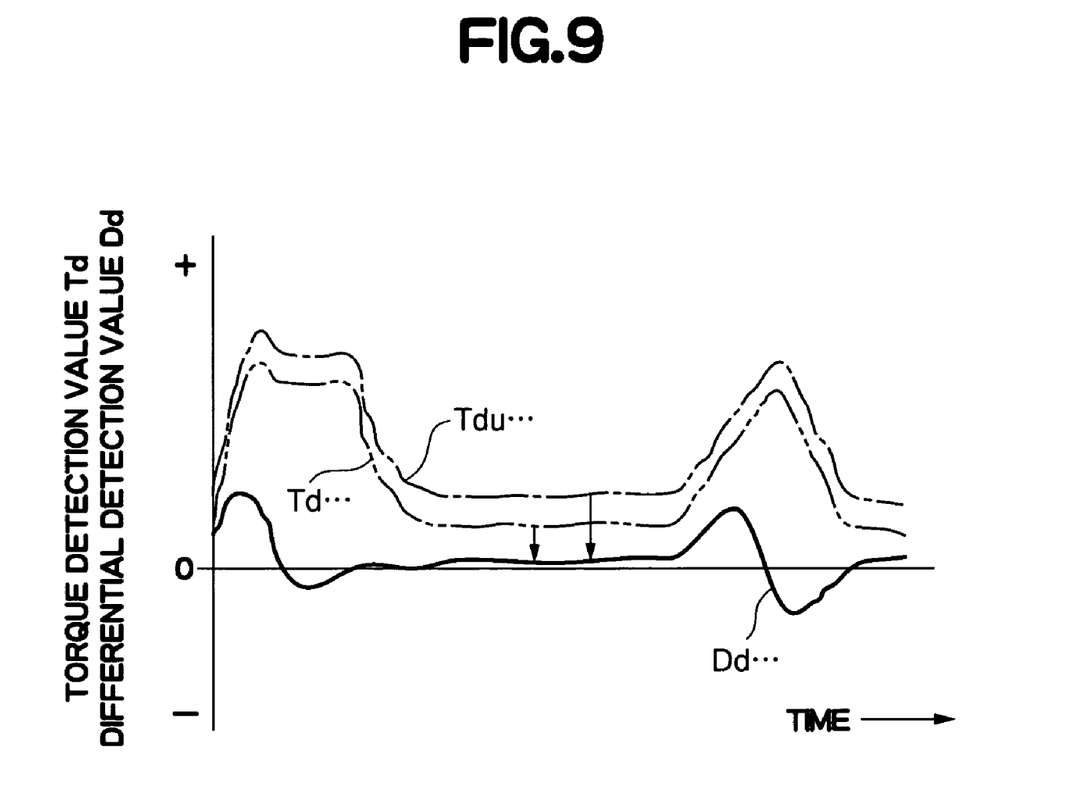
FIG. 9 is a diagram showing an action of the mold-clamping control method.

Meanwhile, values obtained by differentiating the torque detection values Td by means of the differentiator 31 are used as the differential detection value Dd and the threshold value Di that are compared by the torque differentiation-comparison section 32. Since the torque detection values Td are detected in the form of a voltage of the velocity control signal Sc, as shown in FIG. 9, the torque detection values Td have a predetermined plus-side magnitude. The differential detection values Dd correspond to the degree of inclination of the profile of the torque detection values Td, which vary with time. Thus, even when the entirety of the torque detection values Td varies in an increasing direction as represented by the torque detection values Tdu shown in FIG. 9, the magnitude of the differential detection values Dd remains unchanged. Therefore, even when the entirety of the torque detection values Td is shifted because of torque variations caused by, for example, a temperature drift, the method of the present embodiment is free from any influence of the incident, thereby reliably avoiding erroneous detection.

Here, we assume that a foreign object is caught between the movable mold Cm and the stationary mold Cc. In this case, since load torque increases sharply at the time of catching a foreign object, the magnitude of the velocity control signal Ss also increases sharply. Thus, the differential detection value Dd obtained from the torque differentiator 31 increases abruptly and exceeds the threshold value data Dis as represented by Dde in FIG. 8. The torque differentiation-comparison section 32 judges from the abrupt increase that a foreign object has been caught, and the servo circuit 11 supplies a foreign-object detection signal Se to the sequence controller 13. In response thereto, the sequence controller 13 performs predetermined emergency processing such as a retreat operation of the servomotor 2 and generation of an alarm (steps S26 and S27).

Meanwhile, when a normal operation continues without presence of a foreign object, the operation of detecting the differential detection value Dd is repeated at the preset sampling intervals Δts, since the detection value data Ddd do not exceed the threshold value data Dis (steps S28, S23, etc.). When the end of the monitor region is reached, and then the movable platen 3m reaches a low-pressure end position at which low-pressure mold clamping is to be ended; i.e., a high-pressure mold clamping start position, high-pressure mold clamping is performed by means of high-pressure control; and when a predetermined molding operation is completed, a mold opening operation is performed (steps S28 and S29). Notably, Ddd in FIG. 6 indicates detection value data represented by graphing the differential detection values Dd.

Meanwhile, the torque detection value Td that is periodically obtained through periodical detection at the sampling intervals Δts is supplied to the torque comparison section 30. The torque limit value Tu identical in a place of sampling order with the torque detection value Td is supplied to the torque comparison section 30 from the sequence controller 13. Thus, the torque comparison section 30 compares the torque limit value Tu and the torque detection value Td that pertain to the same place of sampling order. When the torque detection value Td increases and reaches the torque limit value Tu, the sequence controller 13 and the servo circuit 11 performs torque control (torque limiting operation) so as to prevent the torque detection value Td from exceeding the torque limit value Tu. Notably, Tdd in FIG. 6 indicates torque detection value data represented by graphing the torque detection values Td.

Figure 3:
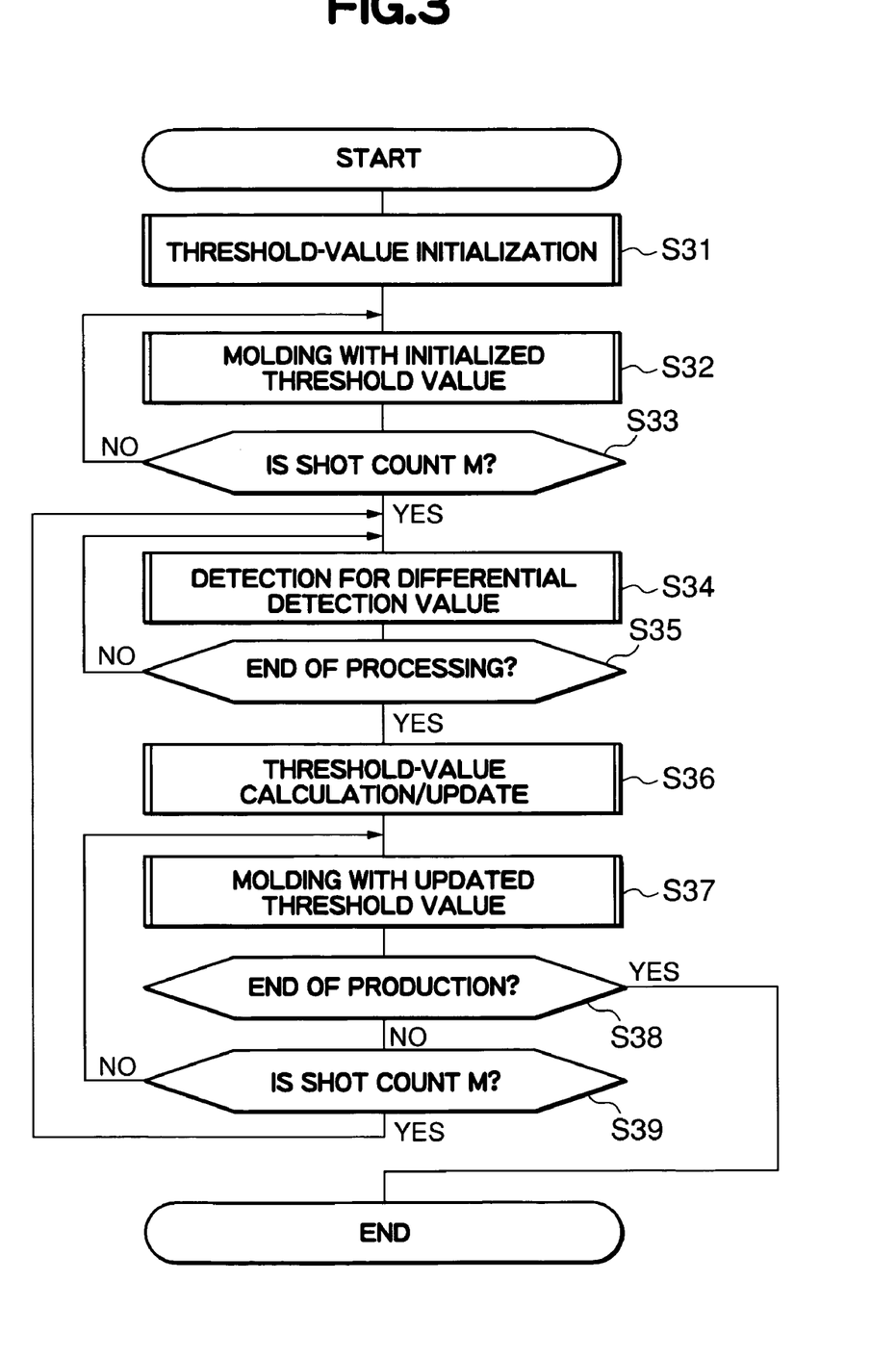
FIG. 3 is a flowchart showing a method of updating threshold data used in the mold-clamping control method.

Next, a method of updating the threshold value Di (threshold value data Dis) will be described with reference to the flowchart shown in FIG. 3.

In the case where the injection molding machine 1 is automatically operated in a 24-hour run mode, the magnitude of torque varies depending on an hour of the day because of, for example, temperature variations between day and night. Thus, even when the threshold data Dis is set properly, erroneous detection may occur at a certain hour of the day during a production run. In order to cope with such a problem, in the present embodiment, each time the number of shots reaches a preset count M, the aforementioned automatic setting mode is effected; specifically, processing is performed in accordance with the flowchart shown in FIG. 1 so as to periodically update (automatically update) the threshold data Dis and the torque limit value data Tus. Therefore, through employment of the periodical update, in combination with the aforementioned use of the differential detection values Dd obtained through differentiation, erroneous detection, which could otherwise result from a disturbance such as temperature variations, can be reliably prevented. The count M can be set to, for example, "100."

In this case, unless an anomalous event (detection of a foreign object) arises, the automatic setting mode can be effected while production is maintained, thereby updating the threshold value data Dis. In FIG. 3, step S31 refers to an operation of initializing the threshold value data Dis in accordance with the flowchart of FIG. 1. When the threshold value Di (threshold value data Dis) is initialized, a molding operation is performed by use of the initialized threshold value Di (threshold value data Dis) (step S32). When the number of shots reaches the preset count M, a detecting operation for obtaining the differential detection value Dd (detection value data Ddd) is performed (steps S33 and S34). In this case, the differential detection value Dd is extracted for each of N shots in accordance with the flowchart of FIG. 1. When the extracting operation is completed for all of N shots, new threshold value data Dis are obtained for update (steps S35 and S36).

When the threshold value Di (threshold value data Dis) is updated, a molding operation is similarly continued by use of the updated threshold value Di (threshold value data Dis) (step S37). Subsequently, a similar updating operation is repeated until production under a production scheme is completed. Specifically, as in the case of initialization, when the number of shots reaches the preset count M, a detecting operation for obtaining the differential detection value Dd is performed. The differential detection value Dd is extracted for each of N shots in accordance with the flowchart of FIG. 1. Subsequently, new threshold value data Dis are obtained for update (steps S38, S39, S34, etc.).

As described above, the mold-clamping control method according to the present embodiment uses, as the detection value Dd, the differential detection value Dd that is obtained by differentiating the torque detection value Td obtained through detection of torque (load torque); thus, the method is free from any influence of an incident in which the entirety of the torque detection values Td is shifted because of torque variations caused by, for example, a temperature drift, thereby avoiding erroneous detection.

Also, in the automatic setting mode, the mold-clamping control method according to the present embodiment performs the steps of periodically detecting torque (load torque) in the monitor region at the preset sampling intervals $\Delta ts$ to thereby obtain detection values (differential detection values) Dd in sampling order; repeating the step of periodical detection for each of a preset number (N) of shots; obtaining the threshold values Di for individual places of sampling order, on the basis of the obtained detection values (differential detection values) Dd, by use of a predetermined arithmetic expression; and setting the obtained threshold values Di for use in control. Thus, even when various kinds of disturbances cause variations in torque, erroneous detection of a foreign object can be reliably prevented, thereby avoiding unnecessary suspension of operation and ensuring high consistency and high reliability in terms of mold-clamping control. Particularly, the average value Xi and the maximum value Xw are obtained from the differential detection values Dd that pertain to the same place of sampling order with respect to all of the shots; and the thus-obtained average value Xi and maximum value Xw are used to obtain the threshold values Di for individual places of sampling order by use of the arithmetic expression $Di=[\{(Xw-Xi) \times ka\}+Xi]+kb$. Alternatively, the minimum value Xs and the maximum value Xw are obtained from the differential detection values Dd that pertain to the same place of sampling order with respect to all of the shots; the median Xj is obtained, on the basis of the minimum value Xs and the maximum value Xw, by use of the arithmetic expression $Xj=(Xw-Xs)/2$; and the threshold values Di are obtained, on the basis of the median Xj and the maximum value Xw, by use of the arithmetic expression $Di=[\{(Xw-Xj) \times ka\}+Xj]+kb$. Thus, accurate threshold values Di can be obtained reliably and consistently. In this case, since the maximum value Xw is a greatest value selected from the values that pertain to a plurality of places of sampling order consisting of the place concerned and a predetermined number of preceding and subsequent places of sampling order, an allowance for dispersion in the time axis direction Ft can be preset, whereby erroneous detection, which could otherwise result from dispersion in the time axis direction Ft, can be avoided. Additionally, after the threshold values Di are set, every time the number of shots reaches the set count M, the threshold values Di are updated by performing the steps of the automatic setting mode. Thus, even when the magnitude of torque varies depending on an hour of the day because of, for example, temperature variations between day and night, employment of the periodical update, in combination with the aforementioned use of the differential detection values Dd obtained through differentiation, can reliably prevent erroneous detection, which could otherwise result from a disturbance such as temperature variations.

The above-described embodiment uses, as a monitor item, torque of the servomotor 2 for performing a mold closing operation. However, the present invention can be applied to the case in which velocity obtained from the velocity converter 27 shown in FIG. 5 is used as a monitor item. In this case, since the extraction value (velocity detection value) Vd is obtained from the velocity converter 27, the velocity detection value Vd is differentiated by means of the velocity differentiator 33 to thereby yield an acceleration value, and the thus-obtained acceleration value is used as the differential detection value Dd. Also, the acceleration comparison section 34 can be caused to perform processing similar to the aforementioned processing that is performed by the torque differentiation-comparison section 32. When such acceleration value (differential detection value Dd) is used, fine variations can be detected without being influenced by the magnitude of servo gain. Therefore, servo gain can be increased so as to ensure good response.

While the present invention has been described with reference to the preferred embodiment, the present invention is not limited thereto. Regarding structural details, technique, among others, modifications, addition, and any omission may be possible as needed without departing from the scope of the invention. For example, no limitation is imposed on arithmetic expressions. Those other than the exemplified arithmetic expressions may be used as needed. Also, the drive mechanism 5 of the embodiment includes the toggle link mechanism 9. However, the present invention can be applied to the case in which a direct-pressure-application type drive mechanism which does not use the toggle link mechanism is employed. Furthermore, in order to obtain a differential detection value, an extraction value may be differentiated with respect to either time or position. Position for use in the differentiation may be the position of the movable platen $3m$ or the position of the cross head $9h$.

What is claimed is:

1. A mold-clamping control method for an injection molding machine, comprising:
    detecting a value of a monitor item in a monitor region predetermined in relation to a mold closing operation during the course of a mold clamping step;
    differentiating a value of a monitor item in order to obtain a differential detection value;
    performing emergency processing when the differential value exceeds a threshold value;
    performing an automatic setting operation including the steps of periodically detecting the value of the monitor item in the monitor region at predetermined sampling intervals to thereby obtain the detection values in sampling order, repeating the step of periodical detection for each of a predetermined number of shots; obtaining a threshold value for each place of sampling order, on the basis of differential detection values, by use of a predetermined arithmetic expression; and storing the obtained threshold values,
    wherein a minimum value Xs and a maximum value Xw are obtained from the detection values that pertain to the same place of sampling order with respect to all of the shots; a median Xj is obtained, on the basis of the minimum value Xs and the maximum value Xw, by use of $Xj=(Xw-Xs)/2$; and a threshold value Di for each place of sampling order is obtained, on the basis of the median Xj and the maximum value Xw, by use of $$Di=[\{(Xw-Xj) \times ka\}+Xj]+kb$$

where ka and kb are constants.

2. A mold-clamping control method for an injection molding machine according to claim 1, wherein the monitor item is torque of a servomotor for performing the mold closing operation.

3. A mold-clamping control method for an injection molding machine according to claim 1, wherein the monitor item is velocity of a servomotor for performing the mold closing operation.

4. A mold-clamping control method for an injection molding machine according to claim 1, wherein the maximum value Xw is a greatest value among the detection values that pertain to a plurality of places of sampling order consisting of the place concerned and a predetermined number of preceding and subsequent places of sampling order.

5. A mold-clamping control method for an injection molding machine according to claim 1, wherein, after the threshold values are set, every time the number of shots reaches a predetermined value, the automatic setting operation is performed in order to update the threshold values.

6. A mold-clamping control method for an injection molding machine, comprising:
    detecting a value of a monitor item in a monitor region predetermined in relation to a mold closing operation during the course of a mold clamping step;
    differentiating a value of a monitor item in order to obtain a differential detection value;
    performing emergency processing when the differential value exceeds a threshold value;
    performing an automatic setting operation including the steps of periodically detecting the value of the monitor item in the monitor region at predetermined sampling intervals to thereby obtain the detection values in sampling order; repeating the step of periodical detection for each of a predetermined number of shots; obtaining a threshold value for each place of sampling order, on the basis of differential detection values, by use of a predetermined arithmetic expression; and storing the obtained threshold values,
    wherein an average value Xi and a maximum value Xw are obtained from the detection values that pertain to the same place of sampling order with respect to all of the shots; and a threshold value Di for each place of sampling order is obtained, on the basis of the average value Xi and the maximum value Xw, by use of $$Di=[\{(Xw-Xi) \times ka\}+Xi]+kb$$

where ka and kb are constants.

7. A mold-clamping control method for an injection molding machine according to claim 6, wherein the maximum value Xw is a greatest value among the detection values that pertain to a plurality of places of sampling order consisting of the place concerned and a predetermined number of preceding and subsequent places of sampling order.

* * * * *